United States Patent [19]

Stolz et al.

[11] Patent Number: 4,548,355
[45] Date of Patent: Oct. 22, 1985

[54] DEVICE FOR REGULATING HEATING CAPACITY OF A HEAT EXCHANGER

[75] Inventors: Albert Stolz, Tübingen; Wolfgang Volz, Magstadt; Günther Sigmund, Sindelfingen, all of Fed. Rep. of Germany

[73] Assignee: Daimler-Benz Aktiengesellschaft, Fed. Rep. of Germany

[21] Appl. No.: 172,945

[22] Filed: Jul. 28, 1980

[30] Foreign Application Priority Data

Jul. 28, 1979 [DE] Fed. Rep. of Germany ....... 2930747

[51] Int. Cl.⁴ ............................................. F28F 27/00
[52] U.S. Cl. ................................... 236/37; 237/12.3 B
[58] Field of Search .............. 236/36, 37; 237/12.3 R, 237/12.3 B; 98/2.06, 2.07, 2.08, 2.05, 2.09, 2.10; 165/69, 139, 82, 173, 174

[56] References Cited

U.S. PATENT DOCUMENTS

| | | | |
|---|---|---|---|
| 2,262,496 | 11/1941 | Hobbs et al. | 236/37 |
| 2,489,652 | 11/1949 | Lehane | 236/37 X |
| 2,801,802 | 8/1957 | Jackson | 237/12.3 B |
| 3,447,603 | 6/1969 | Jones | 165/69 |
| 3,693,532 | 9/1972 | Colinet et al. | 98/2.08 |
| 4,058,255 | 11/1977 | Linder et al. | 237/12.3 B |

Primary Examiner—Harry B. Tanner
Attorney, Agent, or Firm—Craig and Burns

[57] ABSTRACT

A device for regulating the heat output or heat capacity of a heat exchanger in an automotive vehicle with an actuating member to control the flow of a heat exchange medium and with a control device operating the actuating member. To provide input to the control device, signals are received from a highly rated internal temperature sensor and a lower rated heating air temperature sensor disposed at the outlet of the heat exchanger as well as a manually adjustable set point generator. The control device includes a pulse generator producing a triangular voltage of a constant frequency, with a differential amplifier for the signals of the temperature sensors as well as the set point generator. A comparator is provided for producing rectangular pulses in correspondence with the triangular voltage frequency, with a pulse width corresponding to the temperature signal of the differential amplifier. The heat exchanger is tubular and has a large ratio of heat exchange medium volume to heat dissipating surface area. The actuating member is formed as a solenoid valve which is in an open position when the electromagnet of the valve is unenergized. The valve is arranged downstream of the heat exchanger.

14 Claims, 5 Drawing Figures

DEVICE FOR REGULATING HEATING CAPACITY OF A HEAT EXCHANGER

The present invention relates to a regulating device and, more particularly, to a regulating device for regulating or controlling heating capacity of a heat exchanger in an automotive vehicle which includes an actuating member for controlling a flow of heat exchange medium and a control device operating the actuating member, with inputs in the form of a highly rated internal temperature sensor and a lower rated heating air temperature sensor at an outlet of the heat exchanger, as well as a manually adjustable set point generator, wherein the control device include a pulse generator producing a triangular or delta voltage of a constant frequency, a differential amplifier for the signals of the internal temperature sensor, from the heating air temperature sensor, and from the set point generator, and also a comparator for producing rectangular pulses in correspondence with the triangular or delta voltage frequency which rectangular pulses have a pulse width corresponding to the temperature signal of the differential amplifier.

A control device of the aforementioned type is proposed in, for example, Offenlungsschrift 26 15 476 and corresponding U.S. Pat. No. 4,058,255 wherein, by the nonlinearity of the triangular voltage, a method is proposed for attaining, with a low temperature signal, an extremely strong reduction in a width of the rectangular voltage pulse and thereby a quasi constant control of the heating system.

In practical operation or the use of the aforementioned proposed control device, it has now been found that difficulties may occur in maintaining a given temperature in a zone of a greatly reduced heating efficiency, wherein the actuating member for controlling the stream of heat exchange medium is either closed or opened for only a very short period of time. These difficulties are due to the fact that, in efficient heat exchangers with control of the stream of heat exchanging medium, it is necessary, on the one hand, to throttle the average flow to about 1/50 of the maximum value so that a jump between the condition of "no heating" and the condition of "minimum heating power" does not become too large but, on the other hand, based on the usual lengths of the heating conduits, an opening time of at least 0.1 second is reqired for the heat carrying medium to be set into any noticeable motion at all. Additionally, if the heat exchange medium is intermixed with a relatively high proportion of a gas, then a minimum opening time must be even longer due to the compressibility which, under these circumstances, becomes appreciable.

Therefore, in the case of low heating efficiencies, these are sometimes relatively time periods between short term heat exchange medium streams since it may happen that the temperature signal is outside of the enveloping curve of the triangular or delta voltage and thus individual switching intervals are left out.

With heat exchangers which, due to their construction and size, have a small volume of heat exchange medium, the short minimum stream of the heat exchange medium required for a perfect operation can already lead to a complete exchange of the heat exchange medium in the heat exchanger and thereby high air exit temperatures occur for a short period of time which are found to be troublesome especially in the case of a heated interior of the vehicle.

The aim underlying the present invention essentially resides in improving the temperature characteristic of a device for regulating the heating capacity of the heat exchanger in such a manner that, especially with a greatly reduced heating output, a temperature stratification may be attained which is still considered as pleasant while at the time time ensuring that even after a relatively long operating period pressure surges occurring during the switching of the actuating member do not lead to a leakage of the heat exchanger.

In accordance with advantageous features of the present invention, a device for regulating the heat output or heating capacity of a heat exchanger in an automotive vehicle is proposed wherein a tubular heat exchanger, with a high ratio of heat exchange medium volume to heat dissipating tube surface area, is utilized as the heat exchanger, and wherein the actuating member is constituted by a solenoid valve which is open in an unexcited condition of the electromagnet of the valve. The solenoid valve is arranged downstream of the heat exchanger.

By virtue of the above noted features of the present invention, due to the large volume of the heat exchange medium, only a partial volume of the heat exchanger is displaced when the actuating member is open for a short period of time so that a residual volume of already cooled off heat exchange medium remains preserved so thereby the possibility is provided to produce a warmer partial air stream and a cooler partial air stream which is fed in a controlled fashion to specific portions of the passenger space of the motor vehicle.

Due to the heat dissipating tube surface area which is small, based on the volume of heat exchange medium, it is also possible in accordance with the present invention to maintain the air exit temperature at a comparatively low level even in the case of a relatively small through-flow of air. With the solenoid valve being open in an unexcited condition of the electromagnet, it is ensured that even if the valve is inoperative the heating does not fail.

Moreover, due to the arrangement of the valves in accordance with the present invention, pressure surges occurring during a switching operation have the tendency to expand the heat exchanger tubes so that during this critical load phase an increase support of the tubes of the heat exchanger on an associated tube bottom occurs in an advantageous fashion.

In accordance with further features of the present invention, the pressure surges may be absorbed especially smoothly if the heat exchanger includes an elastic material embedding tube ends in the tube bottoms.

Moreover, the foot space and head space of a passenger compartment of the vehicle may, if necessary, be heated differently by dividing the heat exchangers by at least one intermediate tank into two successive zones of differently high temperature levels, wherein the intermediate tank only permits minor heat exchange by, for example, appropriate insulation.

A further increase in differently high temperature level may be attained in accordance with the present invention by providing that a reflux conduit leads away from the intermediate tank, with the conduit, as viewed in a flow direction of the medium, terminating in a return conduit upstream of the actuating member.

It is also possible in accordance with the present invention, to have a reflux conduit lead away from the intermediate tank and to arrange a valve, controllable together with the actuating member, in the conduit, wherein the reflux conduit is connected to the return conduit downstream of the actuating member.

Preferably, in order to obtain a compact construction, in accordance with still further features of the present invention, the actuating member and the valve form one structual unit.

The amount of reflux may be readily adapted also to, for example, individual operating conditions when the valve is open if, for example, a volume governor is arranged in the reflux conduit.

With a subdivision of the stream of the heat exchange medium in the heat exchanger for the purposes of separate heating of the left-hand and right-hand passenger compartment section, advantageously, in accordance with the present invention, a control device which activates a separate actuating member is associated with each passenger space section.

A feed of heat exchange medium to the heat exchanger which is uniform and independent of the engine speed may, in accordance with the present invention, be attained by arranging in the heat exchange medium cycle, a heat exchange medium pump connected in parallel or in series with a coolant pump of the engine of the motor vehicle.

To increase the comfort of the passengers of the vehicle, it is also possible to provide a fan acting upon the heat exchanger, which fan is automatically inserted or rendered operable when the vehicle speed falls short of a predetermined value.

Accordingly, it is an object of the present invention to provide a device for regulating the heat output of a heat exchanger in an automotive vehicle which avoids, by simple means, shortcomings and disadvantages encountered in the prior art.

Another object of the present invention resides in providing a device for regulating the heating capacity of a heat exchanger of an automotive vehicle by which it is possible to attain a pleasant temperature stratification in the vehicle.

Yet another object of the present invention resides in providing a device for regulating the heating capacity of the heat exchanger which enables the controlled feeding of warmer and cooler partial air streams to specific portions of a passenger space of the vehicle.

A further object of the present invention resides in providing a device for regulating the heating capacity of the heat exchanger of a motor vehicle which ensures the operation of the heater even upon a failure in operation of the regulating device.

Yet another object of the present invention resides in providing a device for regulating the heating capacity of a heat exchanger for a motor vehicle which enables an increasing in support of elements of the heat exchanger so as to prevent damage thereto during operation in critical load phases.

A further object of the present invention resides in providing a device for regulating the heating capacity of a heat exchanger for a motor vehicle which functions realiably under all operating conditions of the vehicle.

These and other objects, features, and advantages of the present invention will become more apparent from the following description when taken in connection with the accompanying drawings which show, for the purposes of illustration only, one embodiment in accordance with the present invention, and wherein.

Figure 1:
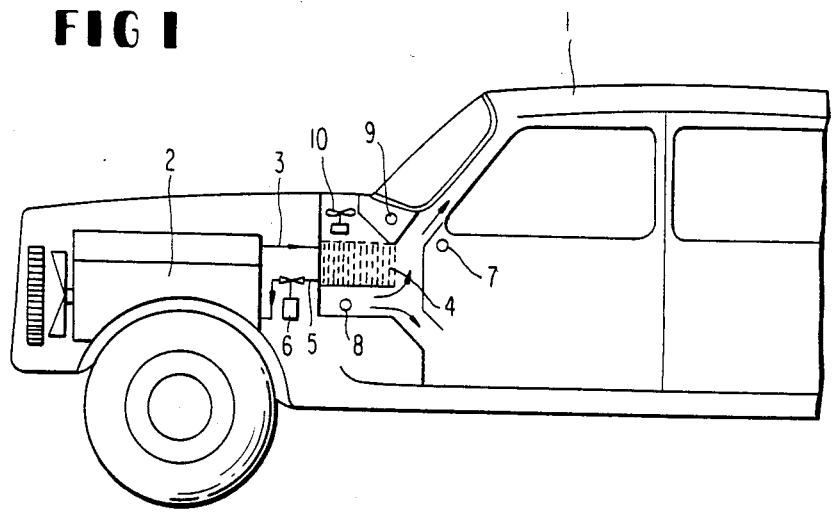
FIG. 1 is a partially schematic side view of a passenger motor vehicle having installed therein a device for regulating the heating capacity of a heat exchanger in accordance with the present invention.
Figure 2:
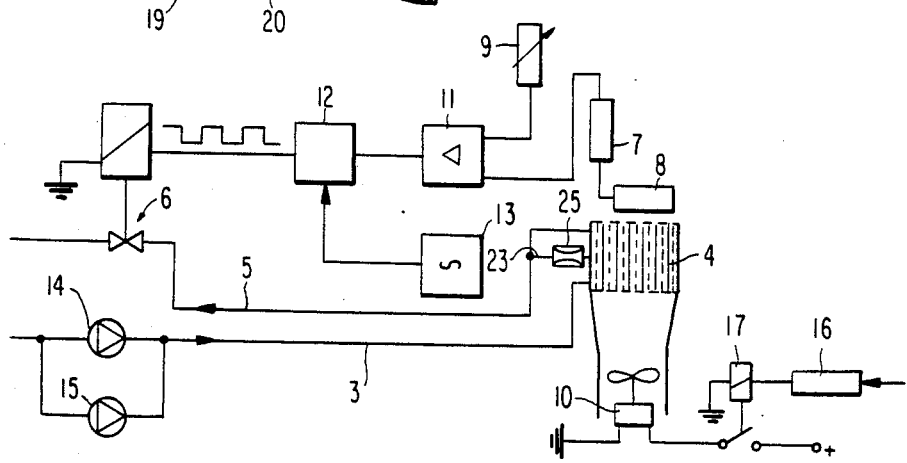
FIG. 2 is a block circuit diagram of the regulating device of FIG. 1.

Referring now to the drawings wherein like reference numerals are used throughout the several views to designate like parts and, more particularly, to FIG. 1, according to this Figure, a schematically illustrated passenger motor vehicle 1 includes an engine block 2, a feed conduit 3 leading from the engine block 2 to a heat exchanger 4, and a return conduit 5 leading away from the heat exchanger 4. An actuating member 6' in the form of an electromagnetic valve 6 is interposed in the return conduit between the heat exchanger 4 and the engine block 2. An internal temperature sensor 7, a heating air temperature sensor 8, and a set point generator 9 all provide output signals representing the input variables for a differential amplifier 11 (FIG. 2). A fan 10 is provided for acting upon the heat exchanger 4 so as to ensure uniform heating of the passenger cell of the vehicle 1 even at low speeds and/or during a standstill of the vehicle. The fan 10 is adapted to be automatically operated, in a conventional manner, when the speed of the vehicle falls below a predetermined value.

The individual components of the control device are shown in the form of a block circuit diagram in FIG. 2 and, according to this figure, the heating air temperature sensor 8 is connected in front of the internal temperature sensor 7 and the combined signal of the sensors 7, 8 form an input signal for the differential amplifier 11. An output signal of the set point generator 9 is also fed into the differential amplifier 11 with such output signal forming the second input to the amplifier 11.

The output signal from the differential amplifier 11 is fed into a comparator 12. The comparator 12 is acted upon or receives an output signal from a pulse generator 13. The pulse generator 13 produces a triangular or delta voltage signal of a constant frequency. The comparator 12 provides an output signal in the form of rectangular pulses which correspond to the triangular voltage frequency, with a pulse width of the rectangular pulses of the comparator 12 corresponding to the temperature signal of the differential amplifier 11.

The output signal and pulses from the comparator 12 are fed to the actuating member 6 which is connected after the comparator 12. The electromagnet of the solenoid valve is open in the unexcited condition and is closed and opened in correspondence with the arriving rectangular pulses or output signal from the comparator 12. A pump 15 for pumping the heat exchange medium is inserted in the feed conduit 3 in parallel to a coolant pump 14 of the engine.

A suitable sensing device 16 is provided for processing a speed signal from, for example, a tachometer shaft, with the sensor device being adapted to activate a relay 17 connected thereafter. The relay 17 is operable to activate the fan 10 if the speed of the vehicle 1 drops below a predetermined value.

Figure 3:
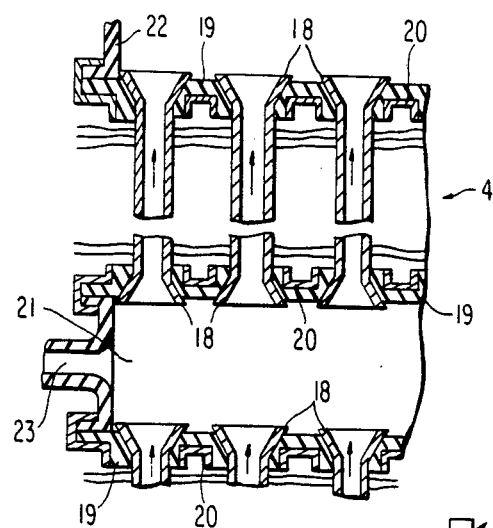
FIG. 3 is a partial cross sectional view of a round-tube heat exchanger employing an elastic material for embedding tube ends and intermediate tank in accordance with the present invention.

As shown in FIG. 3, the heat exchanger 4 is constructed as a round-tube heat exchanger, with ends 18 of the tubes being supported, with the interposition of an elastic heat-resistant material 19, on respectively associated tube bottoms 20 whereby an especially smooth absorption of the switching surges of the actuating member 6 is effected.

The heat exchange medium enters a lower water tank (not shown) and flows in the direction of the arrows indicated in FIG. 3 into an intermediate tank 21 with a particularly low heat dissipating capacity and from the intermediate tank 21 to the upper water tank 22. By virtue of this construction, it is ensured that with a strongly reduced heating output, several opening periods of the actuating member 6 are necessary until the heat exchange medium has been completely exchanged.

Figure 2A:
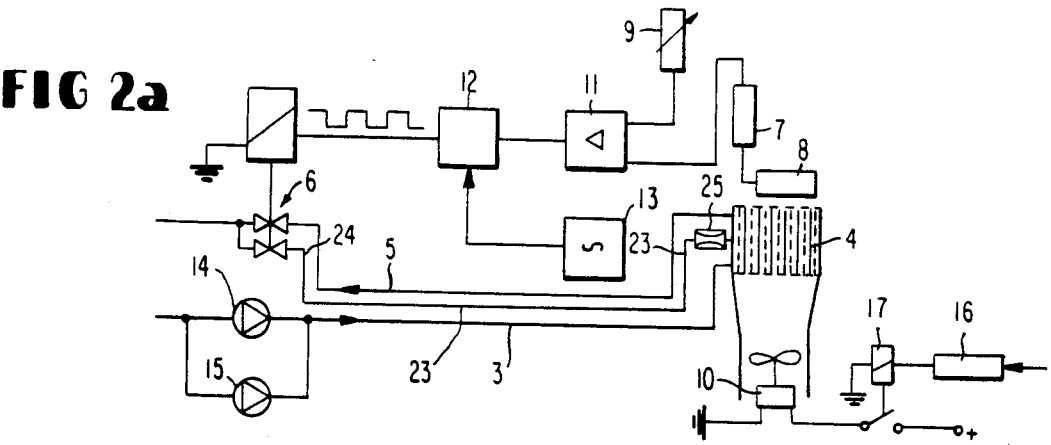
FIG. 2a is a block circuit diagram of a modified form of the regulating device of FIG. 2.

In order to further enhance the heat exchanging process, a reflux conduit 23 is provided which, as shown in FIG. 2, leads away from the intermediate tank 21 and either terminates in the return conduit 5 upstream of the actuating member 6 or, as shown in FIG. 2a, is connected through the interposition of a valve 24, controlled together with the actuating member 6, to the return conduit 5 downstream of the actuating member 6. In order to control or adapt the reflux quantity, a volume governor 25 may, if needed, be installed in the reflux conduit 23.

Figure 2B:
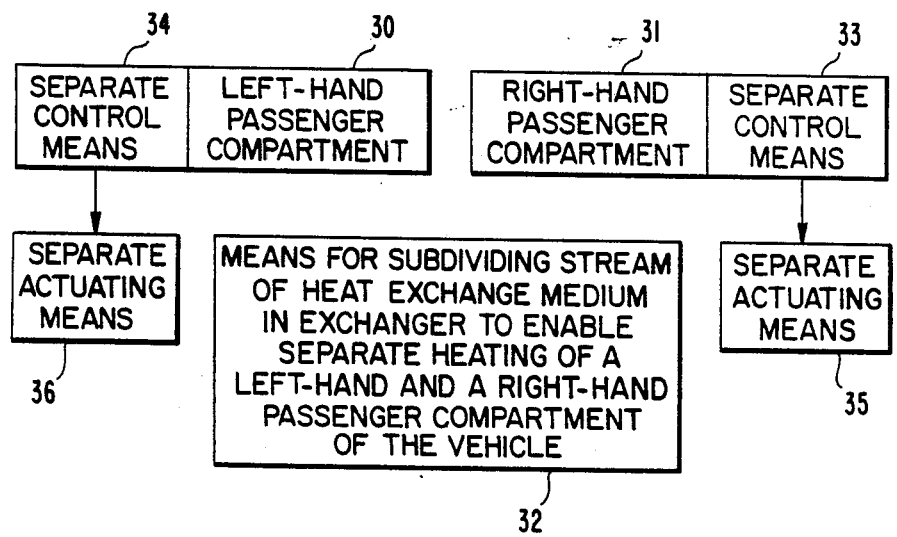
FIG. 2b is a block diagram of a modified form of the invention for separate control of right hand and left hand passenger components of a vehicle.

FIG. 2b shows an embodiment of the invention characterized in that means are provided for subdividing a stream of the heat exchange medium in the heat exchanger so as to enable a separate heating of the left-hand and a right-hand passenger compartment of the vehicle, and in that a separate control means is associated with each compartment section and operates a separate actuating means.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A device for regulating heat output of a heat exchanger of a motor vehicle, the device includes an actuating means for controlling a flow of heat exchange medium through the heat exchanger, and a control means for operating the actuating means in response to predetermined input signals, characterized in that the heat exchanger is a tubular heat exchanger, and in that the actuating means is an electromagnetically operated valve arranged downstream of the heat exchanger, said valve is constructed so as to be in an open condition when the electromagnet is unenergized,
    that each tube of the tubular heat exchanger terminates in a tube end, and in that each tube end is closed off by a tube bottom portion embedded in an elastic material, and
    the heat exchanger is subdivided by at least one intermediate tank into two successive zones having different temperature levels, and in that means are provided at the intermediate tank for permitting only minor heat exchange.

2. A device for regulating heat output of a heat exchanger of a motor vehicle, the device includes an actuating means for controlling a flow of heat exchange medium through the heat exchanger, and a control means for operating the actuating means in response to predetermined input signals, characterized in that the heat exchanger is a tubular heat exchanger, and in that the actuating means is an electromagnetically operated valve arranged downstream of the heat exchanger, said valve is constructed so as to being an open condition when the electromagnet is unenergized,
    that a first temperature sensor is provided for sensing an internal temperature of the vehicle and for providing an output signal of the sensed temperature, a second temperature sensor is arranged in an area of an outlet of the heat exchanger for sensing heating air temperature and for providing an output signal of the sensed air temperature, and a manually set-point generator for providing an output signal of a set temperature, said output signals of said first and second temperature sensors and said set-point generator form the predetermined input signals,
    that the control means includes a pulse generator means for producing a triangular output voltage signal of a constant frequency, a differential amplifier means is interposed between said first and second temperature sensors and said set-point generator and the electromagnetically operated valve, said differential amplifier means receives the output signals from the first and second temperature sensors and the set-point generator and provides an output temperature signal, and in that a comparator means is provided for receiving the output temperature signals from the differential amplifier means and the triangular output voltage signal from the pulse generator means, and for providing an output signal in the form of rectangular pulses in correspondence with the triangular voltage frequency with a pulse width corresponding to the temperature signal of the differential amplifier means,
    each tube of the tubular heat exchanger terminates in a tube end, and each tube end is closed off by a tube bottom portion embedded in an elastic material,
    the heat exchanger is subdivided by at least one intermediate tank into two successive zones having different temperature levels, and means are provided at the intermediate tank for permitting only minor heat exchange.

3. A device for regulating heat output of a heat exchanger of a motor vehicle, the device includes an actuating means for controlling a flow of heat exchange medium through the heat exchanger, and a control means for operating the actuating means in response to predetermined input signals, characterized in that the heat exchanger is a tubular heat exchanger, and in that the actuating means is an electromagnetically operated valve arranged downstream of the heat exchanger, said valve is constructed so as to be in an open condition when the electromagnet is unenergized,
    that the heat exchanger is subdivided by at least one intermediate tank into two successive zones having different temperature levels, and in that means are provided at the intermediate tank for permitting only minor heat exchange.

4. A device for regulating heat output of a heat exchanger of a motor vehicle, the device includes an actuating means for controlling a flow of heat exchange medium through the heat exchanger, and a control means for operating the actuating means in response to predetermined input signals, characterized in that the heat exchanger is a tubular heat exchanger, and in that the actuating means is an electromagnetically operated valve arranged downstream of the heat exchanger, said valve is constructed so as to being an open condition when the electromagnet is unenergized, wherein said heat exchanger comprises at least an intermediate tank, further characterized in that a reflux conduit means extends away from the intermediate tank and terminates in a return conduit at a position upstream of the actuating mens, as viewed in a flow direction of the heat exchange medium.

5. A device for regulating heat output of a heat exchanger of a motor vehicle, the device includes an actuating means for controlling a flow of heat exchange medium through the heat exchanger, and a control means for operating the actuating means in response to predetermined input signals, characterized in that the heat exchanger is a tubular heat exchanger, and in that the actuating means is an electromagnetically operated valve arranged downstream of the heat exchanger, said valve is constructed so as to be in an open condition when the electromagnet is unenergized, wherein said heat exchanger comprises at least an intermediate tank, further characterized in that a reflux conduit means extends away from the intermediate tank and is connected to a return conduit downstream of the actuating means, as viewed in a flow direction of the heat exchange medium.

6. A device for regulating heat output of a heat exchanger of a motor vehicle, the device includes an actuating means for controlling a flow of heat exchange medium through the heat exchanger, and a control means for operating the actuating mens in response to predetermined input signals, characterized in that the heat exchanger is a tubular heat exchanger, and in that the actuating means is an electromagnetically operated valve arranged downstream of the heat exchanger, said valve is constructed so as to be in an open condition when the electromagnet is unenergized, and a control valve means is arranged in a reflux conduit means for controlling a flow through the conduit means, the control valve means is controllable together with the actuating means.

7. A device according to one of claims 1 or 2, characterized in that said means for permitting only minor heat exchange includes insulation disposed at the intermediate tank.

8. A device accordng to one of claims 1 or 2, characterized in that a reflux conduit means extends away from the intermediate tank and terminates in a return conduit at a position upstream of the actuating means, as viewed in a flow direction of the heat exchange medium.

9. A device according to one of claims 1 or 2, characterized in that a reflux conduit means extends away from the intermediate tank and is connected to a return conduit downstream of the actuating means, as viewed in a flow direction of the heat exchange medium.

10. A device according to claim 9, characterized in that a control valve means is arranged in the reflux conduit means for controlling a flow through the conduit means, the control valve means is controllable together with the actuating means.

11. A device according to claim 10, characterized in that the control valve means and the actuating means form a single structural unit.

12. A device according to claim 11, characterized in that a governor means is arranged in the reflux conduit means for controlling a flow volume therethrough.

13. A device for regulating heat output of a heat exchanger of a motor vehicle, characterized in that the heat exchanger is a tubular heat exchanger, actuating means for controlling a flow of heat exchanger medium through the heat exchanger, control means for effecting displacement of only a partial volume of air of the heat exchanger during the time period said activating means is open, said control means comprising means for operating the activating means in response to predetermined input signals.

14. A device according to one of claims 3–6 and having a first temperature sensor provided for sensing an internal temperature of the vehicle and for providing an output signal of the sensed temperature, a second temperature sensor arranged in an area of an outlet of the heat exchanger for sensing heating air temperature and for providing an output signal of the sensed air temperature, and a manually set-point generator for providing an output signal of a set temperature, said output signals of said first and second temperature sensors and said set-point generator form the predetermined input signals, and wherein the control means includes a pulse generator mens for producing a triangular output voltage signal of a constant frequency, a differential amplifier means interposed between said first and second temperature sensors and said set-point generator and the electromagnetically operated valve, said differential amplifier means receives the output signals from the first and second temperature signal, and a comparator means provided for receiving the output temperature signal from the differential amplifier means and the triangular output voltage signal from the pulse generator means, and for providing an output signal in the form of rectangular pulses in correspondence with the triangular voltage frequency with a pulse width corresponding to the temperature signal of the differential amplifier means.

* * * * *